United States Patent
Suslov et al.

(10) Patent No.: US 10,542,072 B1
(45) Date of Patent: Jan. 21, 2020

(54) UTILITIES TOOLBOX FOR REMOTE SESSION AND CLIENT ARCHITECTURE

(71) Applicant: Parallels International GmbH, Schaffhausen (CH)

(72) Inventors: Aleksandr Suslov, Moscow (RU); Ivan Korobov, Moscow (RU); Serguei M. Beloussov, Costa Del Sol (SG); Nikolay Dobrovolskiy, Moscow (RU)

(73) Assignee: PARALLELS INTERNATIONAL GMBH, Schaffhausen (CH)

( * ) Notice: Subject to any disclaimer, the term of this patent is extended or adjusted under 35 U.S.C. 154(b) by 185 days.

(21) Appl. No.: 15/724,376

(22) Filed: Oct. 4, 2017

(51) Int. Cl.
*G06F 15/16* (2006.01)
*H04L 29/08* (2006.01)
*H04L 29/06* (2006.01)
*G06F 9/54* (2006.01)

(52) U.S. Cl.
CPC .......... *H04L 67/025* (2013.01); *G06F 9/547* (2013.01); *H04L 65/1059* (2013.01); *H04L 65/1063* (2013.01)

(58) Field of Classification Search
CPC .............. H04L 67/025; H04L 65/1059; H04L 65/1063; G06F 9/547
USPC ......................................................... 709/203
See application file for complete search history.

(56) References Cited

U.S. PATENT DOCUMENTS

| | | | | |
|---|---|---|---|---|
| 8,463,912 B2* | 6/2013 | Bharadwaj | ............ | H04L 29/06 709/227 |
| 8,589,800 B2* | 11/2013 | Kominac | ............... | H04L 67/02 715/740 |
| RE44,814 E * | 3/2014 | Perholtz | ........................ | 379/38 |
| 8,830,228 B2* | 9/2014 | Zhang | .................. | G06F 9/4411 345/419 |
| 9,137,104 B2* | 9/2015 | Rodrigues | ........... | H04L 41/0806 |
| 9,648,103 B2* | 5/2017 | Avati | .................. | H04L 67/1097 |
| 9,740,507 B2* | 8/2017 | Pinto | ...................... | G06F 9/452 |
| 9,900,182 B2* | 2/2018 | Fausak | ............... | H04L 12/4679 |
| 9,973,584 B2* | 5/2018 | Poliashenko | ........... | H04L 67/18 |
| 10,009,443 B1* | 6/2018 | Guigli | ................... | G06F 9/5077 |
| 10,095,834 B2* | 10/2018 | Howley | ................. | G06F 19/00 |
| 10,291,686 B2* | 5/2019 | Hesselink | ........... | H04L 63/0209 |
| 2013/0073601 A1* | 3/2013 | Jenkins | .................. | G06F 9/547 709/201 |
| 2016/0191604 A1* | 6/2016 | AbiEzzi | ................ | H04L 67/025 715/740 |
| 2017/0374130 A1* | 12/2017 | AbiEzzi | ................ | H04L 67/025 |
| 2019/0104398 A1* | 4/2019 | Owen | .................. | H04W 8/005 |
| 2019/0140900 A1* | 5/2019 | Rodrigues | ........... | H04L 41/0806 |

* cited by examiner

*Primary Examiner* — Melvin H Pollack
(74) *Attorney, Agent, or Firm* — Arent Fox LLP; Michael Fainberg (57) ABSTRACT

Disclosed are systems and methods for executing utility applications in a remote session. A remote session client establishes a remote session between a client device and a remote application server, and determines one or more characteristics of the client device. Responsive to receiving a user request to execute a utility component on the client device, the remote session client may determine an execution location of the utility component based on the characteristics of the client device. Responsive to determining the execution location of the utility component is on the client device, the utility component is executed on the client device; otherwise, the user request is transmitted for execution within the remote session.

17 Claims, 4 Drawing Sheets

UTILITIES TOOLBOX FOR REMOTE SESSION AND CLIENT ARCHITECTURE

FIELD OF TECHNOLOGY

The present disclosure relates generally to the field of computer systems, more specifically, to systems and methods for executing utility applications in a remote session.

BACKGROUND

Application programs can perform a particular utility, task, function, or group of utilities, tasks, or functions for a user of the computer. Application programs may be bundled with an operating system, may be developed as commercial products by third parties, or may be open source. In some cases, an application program may be a part of an application suite, which contains several large applications bundled together as one product. While many multi-function application programs can perform a variety of different sets of utilities, tasks, or functions, often a user may want to perform a very specific desired functionality. Additionally, some application programs, because of their size and complexity, can be cost prohibitive for a user to purchase when they may only need to use a small number of the functions that the application programs provide. Moreover, while a user may know the desired functionality that they wish an application to perform, they may not be aware of any applications that are capable of performing that desired functionality.

There are opportunities to work with remote applications on personal computers, mobile devices, thin clients, etc. For example, a mobile device user wants to select and interface with software application from a remote desktop computer on his mobile device as if applications run on the mobile device. The desktop host computer can have several applications running at the same time either required to the user or started end executed independently. The user applications can be running on the host OS or within a virtual environment, such as a Virtual Machine or a container. However, the industry trend of using mobile devices and various tablets presents some challenges with regard to remote access to desktop/laptop computers. For example, there are no suitable possibilities to perform some useful actions easily on client devices during the utilization of a remote session. Furthermore, despite the fact that mobile devices are becoming more functional, there is still a lack of functionality on some devices that a desktop or laptop can offer.

SUMMARY

Thus, a system and method is disclosed herein for a more efficient and reliable technique for executing utility applications in a remote session.

A method is provided for executing utility applications in a remote session. The method includes establishing, by a remote session client, a remote session between a client device and a remote application server, and determining one or more characteristics of the client device. The method further includes, responsive to receiving a user request to execute a utility component on the client device, determining an execution location of the utility component based on the characteristics of the client device. Responsive to determining the execution location of the utility component is on the client device, the utility component may be executed on the client device. Responsive to determining the execution location of the utility component is on the remote application server, the user request may be transmitted to be executed within the remote session.

According to another aspect, determining the execution location of the utility component is further based on an installation status of the utility component on the client device.

According to another aspect, wherein the utility component performs an action on a target file, and wherein determining the execution location of the utility component is further based on a location of the target file.

According to another aspect, wherein the determined execution location of the utility component is on the remote application server, and the method further includes retrieving a result of the utility component from the remote session.

According to another aspect, wherein the utility component comprises a video converter utility for modifying a target video file for playback on the client device, and wherein determining the execution location of the utility component further includes selecting the client device as the execution location responsive to determining that a size of the target video file is less than a threshold file size.

According to another aspect, wherein the utility component comprises a do-not-disturb utility for disabling notifications, and wherein determining the execution location of the utility component further includes selecting both the client device and the remote session as the execution location for the do-not-disturb utility.

According to another aspect, wherein the utility component comprises a screen capture utility for recording a target area of a display of the client device, and wherein determining the execution location of the utility component further includes responsive to determining that a least a portion of the target area corresponds to the remote session, selecting the remote session as the execution location; and transmitting the user request to execute the screen capture utility to the remote session with one or more parameters indicating the target area of the display.

According to another aspect, wherein the utility component comprises a file archiving utility for compressing a target file, and wherein the remote session is established responsive to receiving the user request to execute the file archiving utility and responsive to determining there are no archiving tools on the client device, wherein a graphical user interface (GUI) of the remote session is refrained from being displayed on the client device. The method further includes sending the target file to the remote session; and responsive to receiving an archived file from the remote session, closing the remote session.

According to one aspect of the present disclosure, a system is provided for executing utility applications in a remote session. The system includes a client device having a memory and a processor. The processor is configured to establish a remote session between the client device and a remote application server, and determine one or more characteristics of the client device. The processor is further configured to, responsive to receiving a user request to execute a utility component on the client device, determine an execution location of the utility component based on the characteristics of the client device. Responsive to determining the execution location of the utility component is on the client device, the processor may execute the utility component on the client device. Responsive to determining the execution location of the utility component is on the remote application server, the processor is configured to transmit the user request to be executed within the remote session.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for executing utility applications in a remote session established between a client device and a remote application server. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Aspects of the present disclosure provide users of a remote session client with utility applications that will simplify their interaction with a client device, including work functions, gaming functions, and other operations. One or more utility applications presented in a "toolbox" application may be embedded in the remote session client. As soon as a user chooses some action to be performed, the remote session client decided whether the action can be realized by the client device or on the server-side. For example, the remote session client may determine whether the needed utility component is installed on the client device, and whether the characteristics of the client device match the prescribed action. If yes, the request can be performed on the client device. If not, the request to initiate the appropriate module may be sent to a remote session agent on the server, i.e., the utility module will be executed within the current session. If there is some result of the operation, it can be delivered back to the client. Accordingly, aspects of the present disclosure prevent the server and session from being overloaded with all utilities that can help people to interact with computer, since the main analysis and some of the operations can be performed by the client device.

Figure 1:
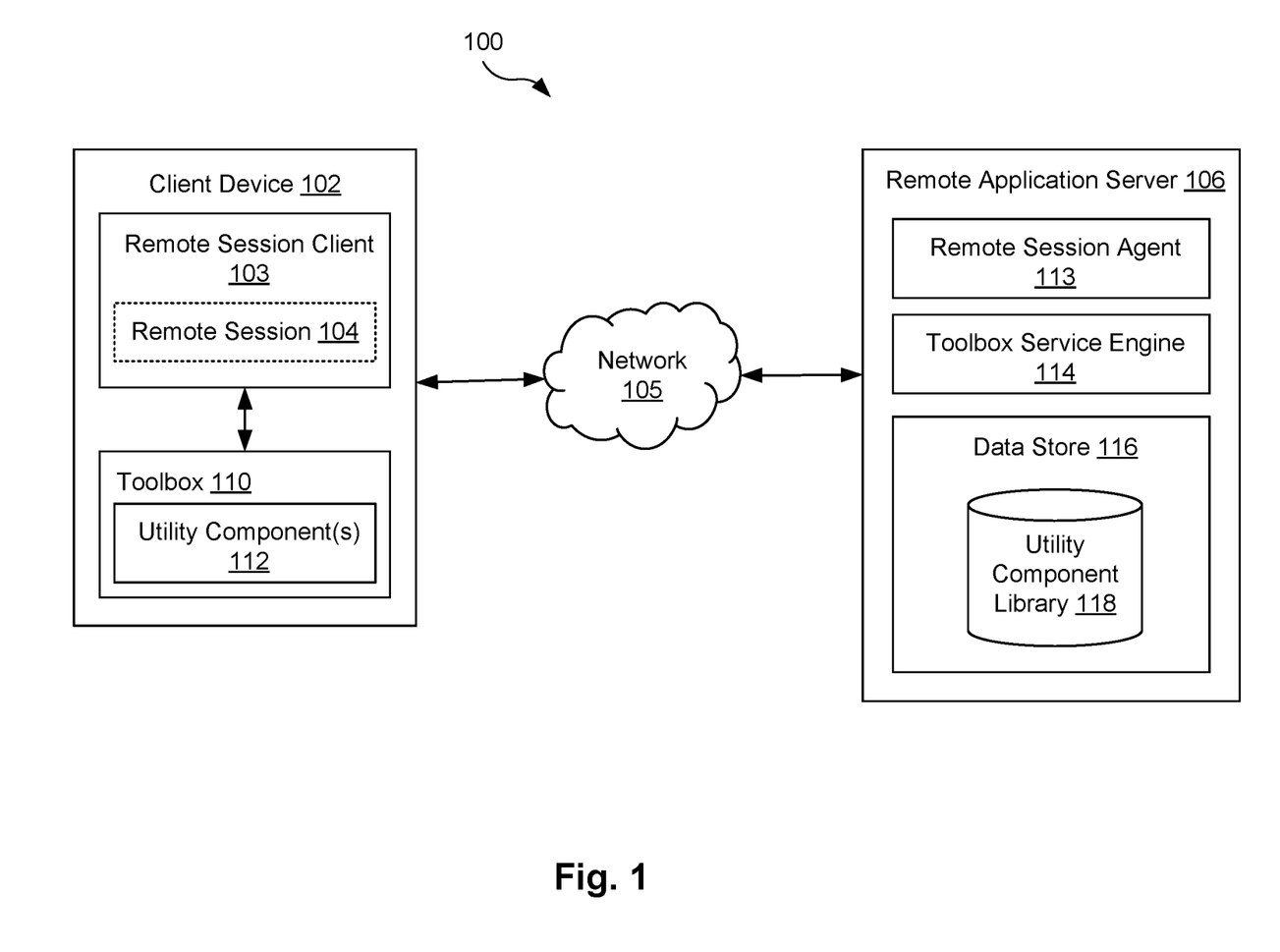
FIG. 1 is a block diagram illustrating a system for executing utility applications in a remote session according to an exemplary aspect.

FIG. 1 is a block diagram illustrating a system 100 for executing utility applications in a remote session according to an exemplary aspect. The system 100 includes a client device 102 communicatively connected to a remote application server 106 via a network 105. The client device 102 may include a remote session client 103 and a toolbox application 110 having one or more utility components 112. The remote application server 106 may include a remote session agent 113, a toolbox service engine 114, and a data store 116 having a utility component library 118. In some aspects, the network 105 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

In one aspect, the remote session client 103 executing on the client device 102 may be configured to establish a remote session 104 with the remote session agent executing on the remote server 106. The remote session 104 established between the remote session client 103 and the remote application server 106 may be configured to provide access at the client device 102 to one or more applications that might not be otherwise available or installed locally on the client device 102. In one aspect, the remote session client 103 may be a remote application server (RAS) agent configured to remotely provide instances of software applications to the client device 102. The remote application server 106 may be a virtual application and desktop delivery system that allows users to access and use applications and data from any device (e.g., client device 102).

In some aspects, the remote session client 103 may be a client application that establishes the remote session 104 as a connection to a new instance of a virtual desktop (e.g., a virtual machine) spawned by the remote application server 106 specifically for a remote session 104, and that allows access to a user's data and applications (e.g., via a roaming profile). An example of a remote application server client application may be a Parallels Remote Application Server (RAS) Client. In other aspects, the remote session client 103 may be a remote access application that establishes the remote session 104 as a remote desktop connection to a specific computing device (having the remote session agent 113 executing thereon), such as the user's desktop at their office, server, or virtual machine. Example of remote access applications include Parallels Access® (formerly Parallels Mobile), Apple Remote Desktop™, Citrix GoToMyPC®, and Virtual Network Computing (VNC®).

In some aspects, the remote session agent 113 may provide a virtual desktop environment, sometimes referred to as a virtual desktop infrastructure (VDI) for executing applications and accessing data (e.g., private files). The remote session agent 113 may capture a window or graphical user interface (GUI) of the remote application executing on the server, and relay that information to the remote session client 103, which in turn renders it for display as a GUI on the client device 102. The relayed information may include literal graphical images, such as a framebuffer of the GUI rendered server-side, and/or graphical primitives that are interpreted by the remote session client 103 to render a GUI locally on the client-side. In some aspects, the remote session 104 may be implemented using a remote desktop protocol, such as Remote Desktop Protocol (RDP), Virtual Network Computing (VNC), or Personal Computer over Internet Protocol (PCoIP).

In one aspect, the toolbox 110 executing on the client device 102 may be configured to manage the installation, configuration, and execution of one or more utility components 112 on the client device 102. Utility components 112 may be software application or modules that each serve a specific need of the user or provide a specific functionality to the user. Utility components 112 may include executable applications, workflow scripts that invoke other applications, reference links that can execute functions exposed by an operating system of the client device 102, reference links that can initiate execution of another utility component 112 stored on the server 106, or the like. In some implementations, a utility component 112 may be an application or component of the operating system executing on the client device 102 that can be invoked by the toolbox 110 to perform the desired functionality for the user. In one implementation, the toolbox 110 may be a software application installed on the client device 102 and invoked by a user (e.g., from a dock, taskbar, or menu bar element). An example graphical user interface (GUI) of a toolbox 110 is described later in conjunction with FIG. 2.

In some aspects, the remote application server 106 may include a toolbox service engine 114 and a data store 116. The toolbox service engine 114 may communicate with the toolbox 110 of the client device 102 to provide utility components capable of performing desired functionality for a user. In some aspects, the data store 116 may be configured to store a utility component library 118 and/or other server data. The toolbox service engine 114 can maintain multiple utility components available for download or remote execution, storing them in the utility component library 118. The utility component library 118 can include executable code, source code that can later be assembled or compiled into executable code, workflows, scripts, reference links (e.g., aliases) to operating system functions, or the like. Data store 116 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

As described above, the remote session client 103 is a client application that is being executed on a client device 102, and allows the remote session 104 to be presented on the client device 102. Since the client device 102 might only show images of what is performed on the server, aspects of the present disclosure enable the possibility to manage the intentions of the user, such as changing a display resolution or archiving, and determining on which computing device (i.e., client device 102 or remote application server 106) the action will be performed. Additionally, aspects of the present disclosure provide more possibilities for executing utility applications for client devices than otherwise possible, for example, due to limited capabilities of certain mobile devices.

In one aspect, the utility components 112 may be embedded upon installation of the remote application server architecture. Some modules (e.g., utility components) may be integrated into the remote session client 103 on the client device 102; some modules, into the remote session agent 113 on the server 106 (e.g., terminal server). Modules that have the same functionality can be installed on both devices 102, 106, such that according to client characteristics the system may decide where the utility operation will be executed and performed. In another aspect, another criterion for choosing the device for performing the operation (e.g., client device 102 or server 106) may be a location of the file itself that is subject to the operation.

In one aspect, initially for the user (of the client device 102), a list of available utilities is provided as soon as they install the remote session client 103 on their client device 102. Since the remote session client 103 has information about the client device (i.e., characteristics), the remote session client 103 may determine which utilities can be executed with the help of the client device 102. When the remote session client 103 determines that the chosen utility chosen by the client operation should be performed on the server 106, the remote session may send a request to the remote session agent 113 to execute a certain module within the particular remote session 104.

For example, if the remote session client 103 determines that the user has a powerful device, then the remote session client 103 may conclude that offloading to the client device 102 would be preferable. If not, then the remote session client 103 may direct the remote session agent 113 to perform the operation on the server. For this reason, the remote session client 103 may formulate a set of rules used to determine the location of execution of a given utility within a particular remote session 104. For example, one rule may set a threshold performance metric or threshold amount of available computing resources for a given device (e.g., "if the computing device 102 is weaker than X", "if the network is faster than Y").

Figure 2:
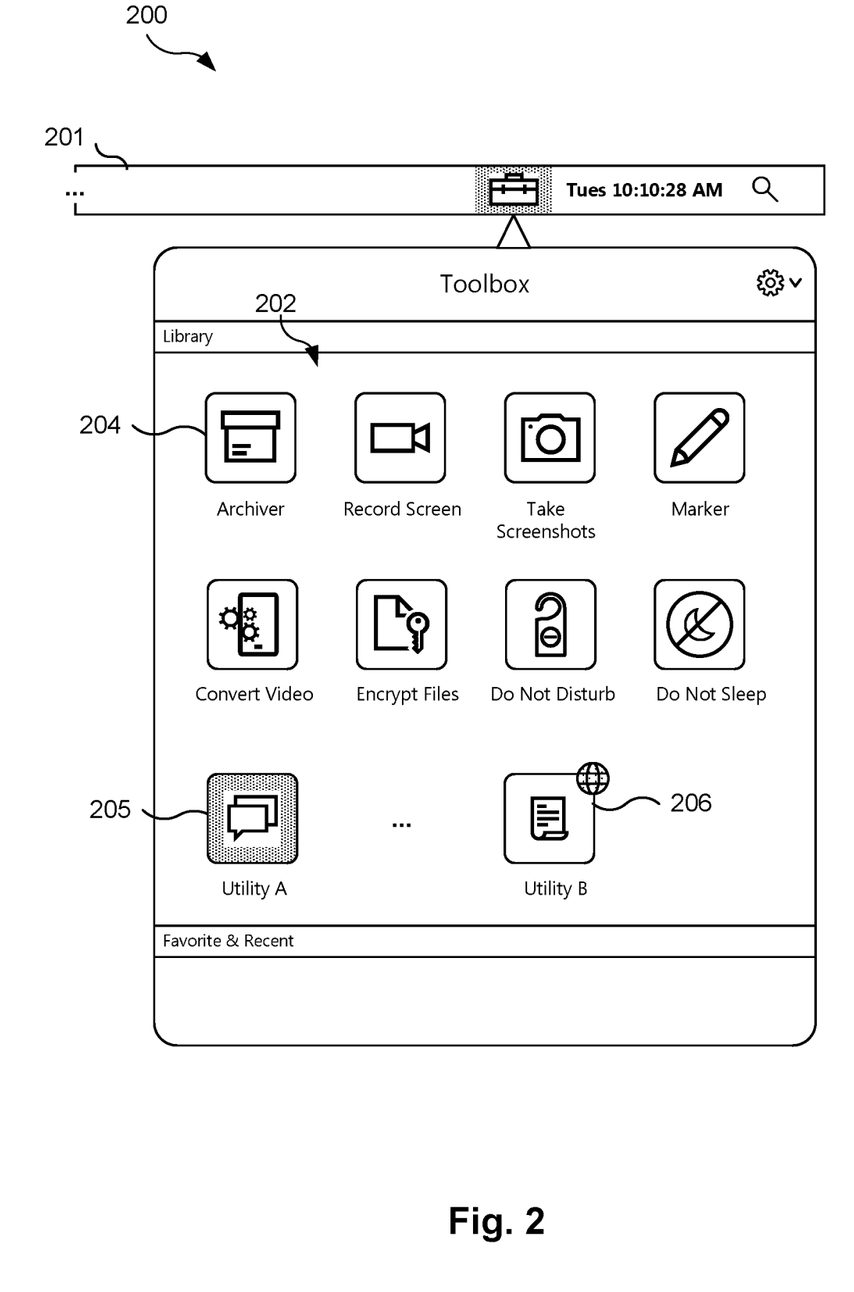
FIG. 2 illustrates an example graphical user interface of a toolbox for executing utility applications in a remote session according to an exemplary aspect.

FIG. 2 illustrates an example graphical user interface (GUI) 200 of a toolbox for executing utility applications in a remote session according to an exemplary aspect. In one aspect, the toolbox 110 may present the graphical user interface 200 on the client device 102. In the example shown, the GUI 200 can be rendered as a popover- or panel-type user interface element launched relative to a toolbox icon in a menu bar 201 of the desktop environment of the client device 102.

In one aspect, the GUI 200 includes a library section 202 having a plurality of user interface elements 204 (e.g., icons) corresponding to each of the utility components 112 made available by the toolbox 110. The utilities included within the library section 202 may include utility components 112 installed and available on the client device 102, utility components that can be downloaded from the utility component library 118, and/or utility components that can be executed remotely on server 106. Each user interface element 204 may be configured to receive user input (e.g., mouse click) and, in response, initiate execution of the corresponding utility component 112 on the appropriate device (e.g., client device 102 or server 106). For example, the desired functionality invoked by the toolbox 110 may include compressing a file or image ("Archiver"), encrypting a file ("Encrypt Files"), recording the display screen as a video ("Record Screen"), taking screenshots ("Take Screenshots"), marking documents ("Marker"), converting video for display on a device ("Convert Video"), enabling a do-not-disturb or do-not-sleep mode ("Do Not Disturb," "Do Not Sleep"), sending a file to a recipient via email, text message, etc., or any other type of functionality capable of being performed by a utility component executed by client device 102.

In some aspects, the GUI 200 may render a portion of user interface elements 204 differently from other user interface elements based on whether it has been determined that the corresponding utility component will be executed (locally)

on the client device 102, or on the remote application server 106. For example, the user interface element 205 includes a different background (e.g., color, pattern) compared to other icons to indicate that the Utility A will be executed on the server 106. In another example, the user interface element 206 includes a graphical indicator (e.g., a "globe" badge) superimposed on the UI element to indicate that the Utility B will be executed on the server 106.

In one aspect, the utility components 112 may include a video converter utility configured to convert any video file into a particular format supported by the client device 102 (i.e., a mobile format such as mp4). During operations, the GUI 200 may receive a user input from the icon (i.e., "Convert Video") corresponding to the video converter utility component and a selection of a target file to be converted. In response, the toolbox 110 may forward the request to convert video to the remote session client 103, which makes several assessments based at least in part on the capabilities of the client device 102.

In one aspect, the remote session client 103 may determine whether to execute the Convert Video utility remotely or locally based a processor speed of the client device 102, a file size of the target file, a network bandwidth between the client device 102 and the server 106, and other criteria. For example, if the target video to be converted has a 2 MB file size and is located on the client device 102, the remote session client 103 may conclude that it is more efficient to convert the video on the client device 102 that it is to transmit to the session, convert it within the session, and send it back to the device 102. In another example, the remote session client 103 may determine that the target video located on the client device has a video file format (e.g., video encoding, container) that is not supported by means of any of the client applications on the client device 102 and present the user with two options: (i) convert the video file and play on the client, or (ii) transmit to the remote session 104 and convert it there.

In another aspect, the utility components 112 may include a Do Not Disturb utility configured to disable or suppress alert messages and extraneous animations on the client device 102, thereby reducing distractions and enabling the user of focus on a given task at hand. Examples of such alert messages and extraneous animations include banner-type or alert-type notifications on a mobile operating system, and application animations that occur on a Dock of a macOS® operating system. During operations, the GUI 200 may receive a user input from the icon corresponding to the "Do Not Disturb" mode. In response, the toolbox 110 may forward the request to the remote session client 103. The remote session client 103 may conclude that is likely desirable to enable the do not disturb mode on the client device 102 as well as within the remote session 104, in order to avoid unexpected notifications from both operating systems (i.e., the operating system of the client device 102 and the operating system within the remote session 104). Accordingly, instructions will be sent to the client system to turn on the "do not disturb" mode, and instructions will be redirected to published applications (e.g., within the remote session/desktop), so that it will be performed on the server side as well. Such instructions may include instructions to expressly turn on a "do not disturb" mode provided by a given operating system, or instructions that manually set various system configurations that implement a de facto "do not disturb" mode.

As shown in the example of the do-not-disturb utility, the remote session client 103 may be configured to execute a utility component 112 locally on the client device as well as within the remote session 104 based on a determination that the effect produced by the utility component should be applied similarly within the remote session 104. In another example, the remote session client 103 may execute a do-not-sleep mode utility configured to modify the display or power management settings of the device to prevent the computing device from going to "sleep" or to prevent the display of the device from dimming. The remote session client 103 may conclude that is likely desirable to enable the "do not sleep" mode on the client device 102 as well as within the remote session 104 in order to ensure a task or presentation (executing in the remote session 104) will not be interrupted by the sleep mode on the client device 102 itself. Accordingly, the remote session client 103 may execute the do-not-sleep utility on the client device 102 and transmit instructions for executing the corresponding utility by the remote session agent 113 on the server 106.

In another aspect, the utility components 112 may include one or more utilities for capturing images or videos of what is visible on a display of the client device (herein referred to collectively as "screen capture"). Such screen capture utilities may include a screenshot creation utility configured to generate a screenshot (also referred to as a screen grab) of the display of the client device 102, and a video recording utility configured to generate a digital recording (screencast) of the client device 102. During operations, the GUI 200 may receive a user input from the icon(s) corresponding to the screenshot creation utility (i.e., "Record Screen", "Take Screenshots"). Optionally, the GUI 200 may further receive user input indicating a particular area of the display to be captured, for example, an area defined by a selection box drawn by the user, or an area corresponding to an (active) window selected by the user (otherwise the entirety of the display is recorded). In response, the toolbox 110 may forward the screen capture request to the remote session client 103.

In one example, the user may seek to generate a screenshot image of what is being displayed in the remote session 104. Responsive to determining that at least some portion of the target area of the screen capture includes the GUI of the remote session 104, the remote session client 103 may send a corresponding screen capture request to the remote session 104 with the parameters of the user selected area, if any. On the server side, the remote session agent 113 may generate a screenshot using a given display resolution, which may be the default resolution, or a resolution calculated to match the display resolution of the client device 102. (Similarly, the remote session agent 113 may initiate a video recording using a video recording utility component installed on the server.) The remote session agent 113 sends the resultant screen capture back to the client device. In some aspects, the remote session client 103 may re-assemble or merge the returned screen capture with any locally-generated screen capture of the target area (i.e., that was not part of the GUI of the remote session) to produce a single, seamless screen capture.

In another aspect of the present disclosure, the toolbox 110 may be configured to perform the offloaded operations without presenting to the user the process itself (e.g., GUI). That is, from the perspective of the user, the operations will appear as if the chosen utility is being executed by their client device 102, i.e., as an extension of the client device's functionality.

For example, the utility components 112 may include a file archiving utility configured to compress one or more target files to use less storage space. Conversely, the file archiving utility may be configured to unarchive any archived files (e.g., RAR files, zip files, tar files). During operations, the GUI 200 may receive a user input from the icon (i.e., "Archiver") corresponding to the file archiving utility and a selection of one or more target files to be archived. In response, the toolbox 110 may forward the archiving request to the remote session client 103, which makes an assessment based on the characteristics of the client device 102 and the availability of the requested utility component on the client device.

For example, the remote session client 103 may determine that there is not appropriate utility installed on the client device for performing the file archiving. Meanwhile, the remote session client 103 may further determine that a universal archiver is available on the remote application server 106 (e.g., from the toolbox service engine 114, or the utility component library 118). The remote session client 103 may indicate that there are no application on the client device for this functionality, and initiates a remote session with the needed module for such an operation. In response to the remote session being active, the remote session client 103 on the client device sends the file to the remote session and requests to archive it. After the operation is complete, the archived file is sent back to the client.

In one aspect, the utility components 112 may include a utility configured to convert any video file into a particular format supported by the client device 102. During operations, the GUI 200 may receive a user input from the icon (i.e., "Convert Video") corresponding to the video converter utility component and a selection of a target file to be converted. In response, the toolbox 110 may forward the request to convert video to the remote session client 103, which makes several assessments based at least in part on the capabilities of the client device 102.

In another aspect of the present disclosure, the toolbox 110 may be configured to execute utilities that employ a specialized hardware module of the client device 102. For example, the utility components may include a file encryption utility configured to encrypt one or more target files using a biometric sensor module of the client device 102. Examples of a biometric sensor modules include fingerprint scanners (such as the Touch ID® module made available by Apple®), iris scanners, facial recognition modules, and so forth. During operation, the target file(s) may be located on the server 106 within the remote session 104. By initiating the appropriate command (i.e., activating the "Encrypt Files" icon in the GUI 200), the file encryption utility component installed on the client device 102 may receive a unique digital signature from a fingerprint scanner of the client device 102 and use the signature to encrypt the target file through the remote session 104. Consequently, the file will not be decrypted without the certain unique digital signature (i.e., Touch ID).

In another aspect, the utility components 112 may include a marker utility component configured to annotate documents using a sensor module of the client device 102. For example, the marker utility may allow drawing on a screen of the client device with a PDF document opened to set a mark, such as highlighting the text of the document with color, etc. The sensor module of the client device 102 may be configured to detect user input via a stylus or other input objects (i.e., capacitive touch sensing). During operation, the GUI 200 may receive a user input from the icon (i.e., "Marker") corresponding to the marker utility and initiate the marker utility. The marker utility may track the coordinates indicated by the user on the screen (e.g., as received from the sensor module) for a document displayed in the remote session 104. The marker utility installed on the client device may transmit the coordinates and other parameters to the server 106, where a corresponding remote module of the marker utility will perform the setting of the appropriate markers.

Figure 3:
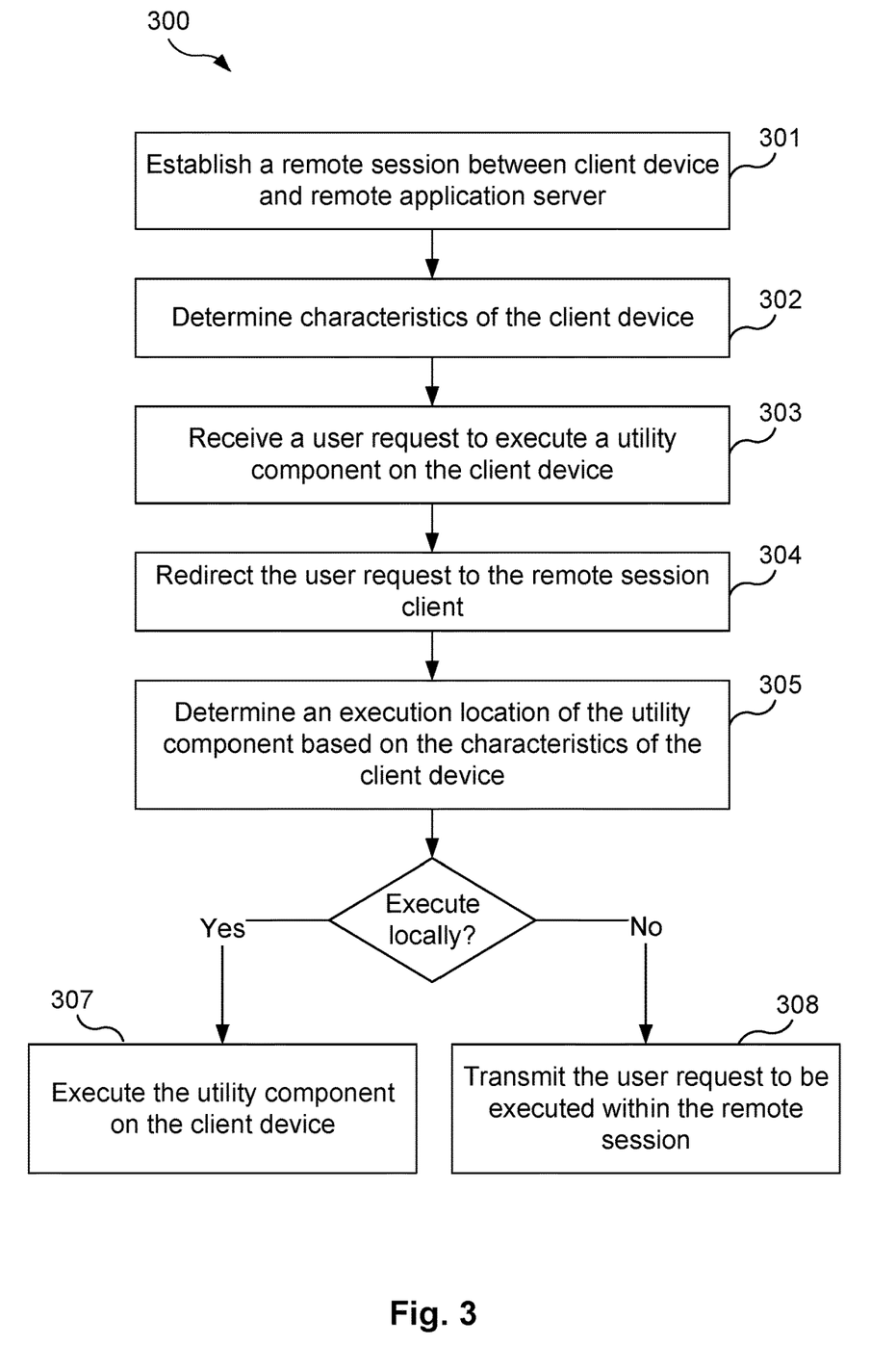
FIG. 3 is a flowchart illustrating a method for executing utility applications in a remote session according to an exemplary aspect.

FIG. 3 is a flowchart illustrating a method 300 for executing utility applications in a remote session according to an exemplary aspect. It is noted that the following description of the exemplary method makes reference to the system and components described above.

The method 300 begin at step 301, in which the remote session client 103 establishes a remote session 104 between a client device 102 and a remote application server 106. In some aspects, the remote session client 103 may connect to the corresponding remote session agent 103 executing on the server 106 to provide access to remote applications or remote desktops. As described later, in some aspects, the remote session 104 may be established in response to a toolbox utility execution.

At step 302, the remote session client 103 may determine one or more characteristics of the client device. In one aspect, the remote session client may gather information on the client device 102 on which it is installed, including hardware capabilities, display configurations (resolution, etc.), the installation status of any utility components 112 within the toolbox 110.

At step 303, the toolbox application 110 may receive a user request to execute a utility component on the client device 102, for example, through a user action via the GUI 200. In some aspects, the input action can be a toggle-on action (e.g., selecting an input element on the user interface to enable or start a utility component), a toggle-off action (e.g., selecting an input element on the user interface to disable or stop a utility component), a push button action (e.g., selecting an input element on the user interface to execute a utility component a single time), a drag and drop action, or any similar input action capable of being detected by a user interface. At step 304, in some aspects, the toolbox application 110 may optionally redirect the user request to the remote session client 103.

At step 305, responsive to receiving a user request to execute a utility component on the client device, the remote session client 103 may determine an execution location of the utility component based on the characteristics of the client device. In some aspects, the utility component may executed remotely (transferred into the remote session 104), locally (executed on the client device 102), or some combination thereof. In some aspects, the remote session client 103 analyzes what is needed to perform the action, what are the characteristics of the client device, where a target file (if any) subject to the utility component is located, etc. The remote session client 103 may use one or more rules associated with the characteristics of the client device, such as the capabilities of the client device, whether the client device 102 is weaker than a particular performance metric, or whether the network connection (e.g., via network 105) is faster than a particular threshold metric. In some aspects, the remote session client may determine the execution location of the utility component is based on an installation status of the utility component on the client device. That is, the utility component 112 may have been displayed to the user due its existence in the utility component library 118, but is not presently installed within the client device 102.

In some aspects, the utility component subject to the user request may be a video converter utility for modifying a target video file for playback on the client device. In such cases, the remote session client 103 may select the client device as the execution location responsive to determining that a size of the target video file is less than a threshold file size (e.g., less than 2 MB). In another aspect, the utility component subject to the user request may be a do-not-disturb utility for disabling notifications. In such cases, the remote session client 103 may select both the client device and the remote session as the execution location for the do-not-disturb utility.

At step 307, responsive to determining the execution location of the utility component is on the client device, the remote session client 103 may execute the utility component on the client device. At step 308, responsive to determining the execution location of the utility component is on the remote application server, the remote session client 103 may transmit the user request to be executed within the remote session 104, e.g., to the remote session agent 113 executing on the remote application server 106. In some aspects, subsequently, the remote session client 103 may retrieve a result of the utility component from the remote session, or perform some other post-operation result.

For example, the utility component subject to the user request may be a screen capture utility for recording a target area of a display of the client device. In some aspects, the remote session client 103 may determine that a least a portion of the target area corresponds to the remote session. If so, the remote session client 103 may select the remote session as the execution location, and then transmit the user request to execute the screen capture utility to the remote session 104 with one or more parameters indicating the target area of the display.

In another example, the utility component subject to the user request may be a file archiving utility for compressing a target file. In this case, the remote session 104 may in fact be established responsive to receiving the user request to execute the file archiving utility, and the GUI of the remote session 104 (i.e., remote desktop) is refrained from being displayed on the client device 102. Responsive to determining there are no archiving tools on the client device, the remote session client 103 may send the target file to the remote session 104, and responsive to receiving the (resultant) archived file from the remote session, close the remote session. In other words, the remote session client launched the remote session as an auxiliary session for the specific task of executing the file archiving utility.

Figure 4:
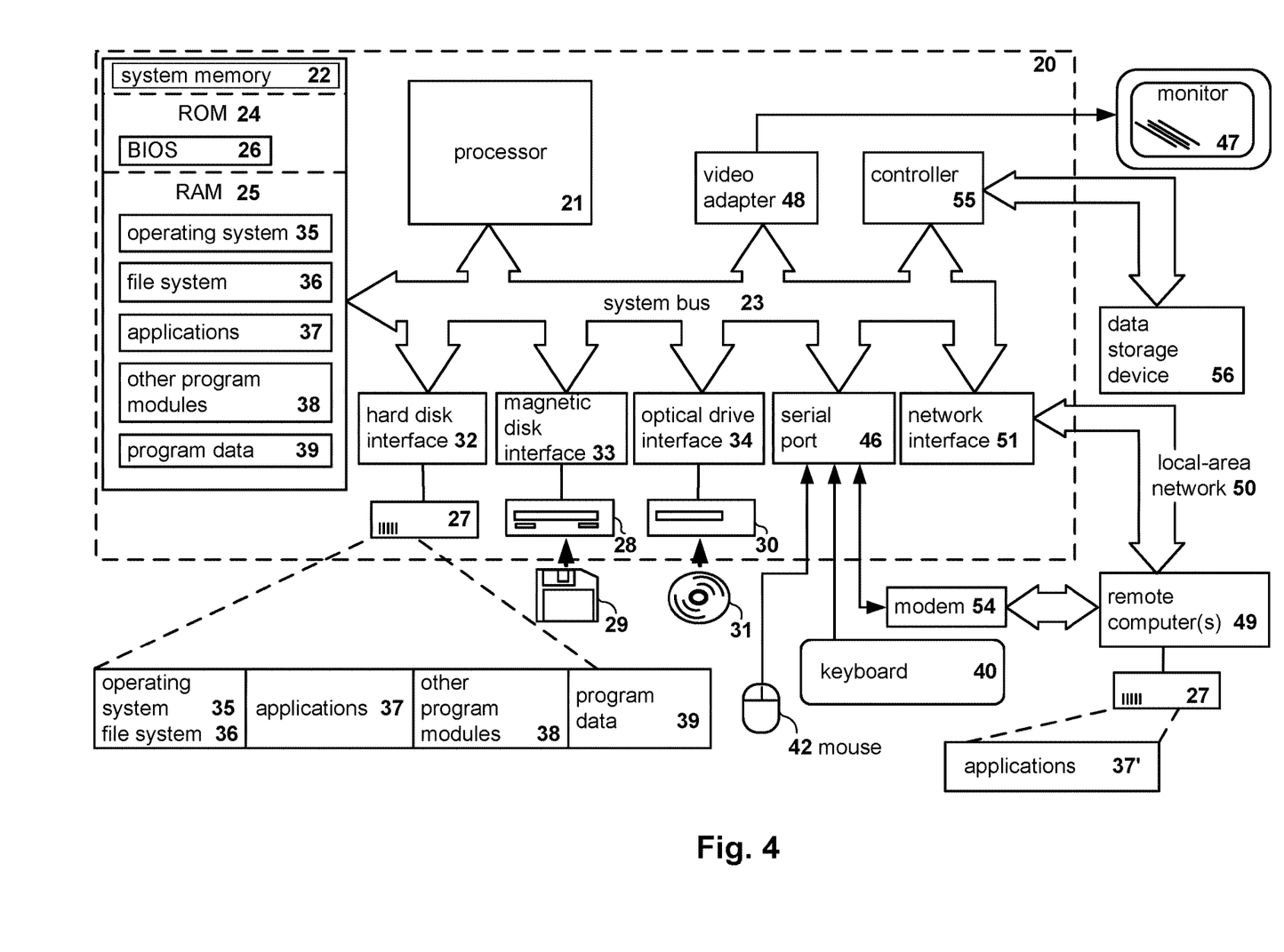
FIG. 4 is a block diagram of a general-purpose computer system on which the disclosed system and method can be implemented according to an exemplary aspect.

FIG. 4 is a block diagram illustrating a general-purpose computer system 20 on which aspects of systems and methods for executing utility applications in a remote session may be implemented in accordance with an exemplary aspect. It should be noted that the computer system 20 can correspond to the client device 102, remote application server 106, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for executing utility applications in a remote session, wherein the method comprises:
    establishing, by a remote session client, a remote session between a client device and a remote application server;
    determining one or more characteristics of the client device;
    responsive to receiving a user request to execute a utility component on the client device, wherein the utility component performs an action on a target file, determining an execution location of the utility component based on both the characteristics of the client device and a location of the target file;
    responsive to determining the execution location of the utility component is on the client device, executing the utility component on the client device; and
    responsive to determining the execution location of the utility component is on the remote application server, transmitting the user request to be executed within the remote session.

2. The method of claim 1, wherein determining the execution location of the utility component is further based on an installation status of the utility component on the client device.

3. The method of claim 1, wherein the determined execution location of the utility component is on the remote application server, the method further comprises:
    retrieving a result of the utility component from the remote session.

4. The method of claim 1, wherein the target file is a target video file, wherein the action comprises modifying, by a video converter utility of the utility component, the target video file for playback on the client device, and wherein determining the execution location of the utility component further comprises:
    selecting the client device as the execution location responsive to determining that a size of the target video file is less than a threshold file size.

5. The method of claim 1, wherein the utility component comprises a do-not-disturb utility for disabling notifications, and wherein determining the execution location of the utility component further comprises:
    selecting both the client device and the remote session as the execution location for the do-not-disturb utility.

6. The method of claim 1, wherein the utility component comprises a screen capture utility for recording a target area of a display of the client device, and wherein determining the execution location of the utility component further comprises:
    responsive to determining that a least a portion of the target area corresponds to the remote session, selecting the remote session as the execution location; and
    transmitting the user request to execute the screen capture utility to the remote session with one or more parameters indicating the target area of the display.

7. The method of claim 1, wherein the utility component comprises a file archiving utility for compressing the target file;
    wherein the remote session is established responsive to receiving the user request to execute the file archiving utility and responsive to determining there are no archiving tools on the client device, wherein a graphical user interface (GUI) of the remote session is refrained from being displayed on the client device, wherein the method further comprising:
    sending the target file to the remote session; and
    responsive to receiving an archived file from the remote session, closing the remote session.

8. A system for executing utility applications in a remote session, the system comprising:
    a client device having a memory and a processor,
    wherein the processor is configured to:
        establish a remote session between the client device and a remote application server;

determine one or more characteristics of the client device;

responsive to receiving a user request to execute a utility component on the client device, wherein the utility component performs an action on a target file, determine an execution location of the utility component based on both the characteristics of the client device and a location of the target file;

responsive to determining the execution location of the utility component is on the client device, execute the utility component on the client device; and responsive to determining the execution location of the utility component is on the remote application server, transmit the user request to be executed within the remote session.

9. The system of claim 8, wherein the processor configured to determine the execution location of the utility component is further configured to determine the execution location based on an installation status of the utility component on the client device.

10. The system of claim 8, wherein the determined execution location of the utility component is on the remote application server, wherein the processor is further configured:

retrieve a result of the utility component from the remote session.

11. The system of claim 8, wherein the target file is a target video file, wherein the action comprises modifying, by a video converter utility of the utility component, the target video file for playback on the client device, and wherein the processor configured to determine the execution location of the utility component is further configured to:

select the client device as the execution location responsive to determining that a size of the target video file is less than a threshold file size.

12. The system of claim 8, wherein the utility component comprises a do-not-disturb utility for disabling notifications, and wherein the processor configured to determine the execution location of the utility component is further configured to:

select both the client device and the remote session as the execution location for the do-not-disturb utility.

13. The system of claim 8, wherein the utility component comprises a screen capture utility for recording a target area of a display of the client device, and wherein the processor configured to determine the execution location of the utility component is further configured to:

responsive to determining that a least a portion of the target area corresponds to the remote session, select the remote session as the execution location; and transmit the user request to execute the screen capture utility to the remote session with one or more parameters indicating the target area of the display.

14. The system of claim 8, wherein the utility component comprises a file archiving utility for compressing the target file;

wherein the remote session is established responsive to receiving the user request to execute the file archiving utility and responsive to determining there are no archiving tools on the client device, wherein a graphical user interface (GUI) of the remote session is refrained from being displayed on the client device, wherein the processor is further configured to:

send the target file to the remote session; and responsive to receiving an archived file from the remote session, close the remote session.

15. A non-transitory computer readable medium comprising computer executable instructions for executing utility applications in a remote session, including instructions for:

establishing, by a remote session client, a remote session between a client device and a remote application server;

determining one or more characteristics of the client device;

responsive to receiving a user request to execute a utility component on the client device, wherein the utility component performs an action on a target file, determining an execution location of the utility component based on both the characteristics of the client device and a location of the target file;

responsive to determining the execution location of the utility component is on the client device, executing the utility component on the client device; and responsive to determining the execution location of the utility component is on the remote application server, transmitting the user request to be executed within the remote session.

16. The non-transitory computer readable medium of claim 15, wherein the instructions for determining the execution location of the utility component further comprise instructions for determining the execution location based on an installation status of the utility component on the client device.

17. The non-transitory computer readable medium of claim 15, wherein the determined execution location of the utility component is on the remote application server, wherein the instructions further comprise:

retrieving a result of the utility component from the remote session.

\* \* \* \* \*